US009626994B2

(12) United States Patent
Bui et al.

(10) Patent No.: US 9,626,994 B2
(45) Date of Patent: *Apr. 18, 2017

(54) USAGE OF STATE INFORMATION FROM STATE-SPACE BASED TRACK-FOLLOW CONTROLLER

(71) Applicant: International Business Machines Corporation, Armonk, NY (US)

(72) Inventors: Nhan X. Bui, Tucson, AZ (US); Angeliki Pantazi, Thalwil (CH); Tomoko Taketomi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/846,708

(22) Filed: Sep. 4, 2015

(65) Prior Publication Data

US 2015/0380033 A1    Dec. 31, 2015

Related U.S. Application Data

(63) Continuation of application No. 14/307,286, filed on Jun. 17, 2014, now Pat. No. 9,159,347.

(51) Int. Cl.
*G11B 5/58*    (2006.01)
*G11B 5/584*    (2006.01)
*G11B 5/008*    (2006.01)

(52) U.S. Cl.
CPC .......... *G11B 5/584* (2013.01); *G11B 5/00813* (2013.01)

(58) Field of Classification Search
CPC .. G11B 5/56; G11B 5/58; G11B 5/584; G11B 5/00813; G11B 15/1808; G11B 15/602; G11B 15/43
See application file for complete search history.

(56) References Cited

U.S. PATENT DOCUMENTS

| 4,523,227 | A | * | 6/1985 | Hurst ................... G11B 27/005 |
| | | | | 348/459 |
| 5,395,066 | A | * | 3/1995 | Yokoyama ......... G11B 15/1875 |
| | | | | 242/334.2 |
| 5,452,153 | A | | 9/1995 | Baheri et al. |
| 5,602,688 | A | | 2/1997 | Yokoyama et al. |
| 5,725,168 | A | | 3/1998 | Yokoyama et al. |
| 5,828,514 | A | | 10/1998 | Chliwnyj et al. |
| 5,872,672 | A | | 2/1999 | Chliwnyj et al. |
| 8,094,407 | B2 | | 1/2012 | Cherubini et al. |
| 9,159,347 | B1 | * | 10/2015 | Bui ................... G11B 5/00813 |

(Continued)

FOREIGN PATENT DOCUMENTS

WO    2013160847 A1    10/2013

OTHER PUBLICATIONS

List of IBM Patents or Patent Applications Treated as Related.
Boettcher et al., "Dynamic Modeling and Control of a Piezo-Electric Dual-Stage Tape Servo Actuator," IEEE Transactions on Magnetics, vol. 45, No. 7, Jul. 2009, pp. 3017-3024.
De Callafon et al., "Adaptive Regulation of Time Varying Disturbances in a Tape Storage System," 6th IFAC Symposium on Mechatronic Systems, The International Federation of Automatic Control, Apr. 10-12, 2013, pp. 478-483.

(Continued)

*Primary Examiner* — Thang Tran
(74) *Attorney, Agent, or Firm* — Zilka-Kotab, PC

(57) ABSTRACT

A method according to one embodiment includes generating track following controller state information based on a positional signal of a head relative to a medium. One or more portions of the state information corresponding to particular frequencies are used to determine at least one of: lateral tape movement, tape skew, vibration operation conditions, and roller performance.

20 Claims, 11 Drawing Sheets

(56) References Cited

U.S. PATENT DOCUMENTS

| | | |
|---|---|---|
| 2006/0126214 A1* | 6/2006 | Bui ..................... G11B 15/688 360/77.12 |
| 2007/0230033 A1 | 10/2007 | McAllister et al. |
| 2009/0316296 A1 | 12/2009 | Cherubini et al. |
| 2013/0335857 A1 | 12/2013 | Bui et al. |

OTHER PUBLICATIONS

Zhong et al., "Combined Feedfoward/Feedback Control for Tape Head Track-Following Servo Systems," Preprints of the 18th IFAC World Congress, Aug. 28-Sep. 2, 2011, pp. 4040-4045.

Zhong et al., "Feedfoward Control for Disturbance Rejection: Model Matching and Other Methods," Proceedings of the 24th Chinese Control and Decision Conference, 2012, pp. 3528-3533.

Zhong et al., "H2 Model Matching Feedfoward Control for Tape Head Positioning Servo Systems," American Control Conference, Jun. 17-19, 2013, pp. 4504-4509.

Non-Final Office Action from U.S. Appl. No. 14/307,286, dated Sep. 24, 2014.

Final Office Action from U.S. Appl. No. 14/307,286, dated Mar. 19, 2015.

Notice of Allowance from U.S. Appl. No. 14/307,286, dated Jun. 8, 2015.

Bui et al., U.S. Appl. No. 14/307,286, filed Jun. 17, 2014.

* cited by examiner

USAGE OF STATE INFORMATION FROM STATE-SPACE BASED TRACK-FOLLOW CONTROLLER

BACKGROUND

The present invention relates to data storage systems, and more particularly, this invention relates to using state information of a track-follow controller for various purposes.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

BRIEF SUMMARY

A method according to one embodiment includes generating track following controller state information based on a positional signal of a head relative to a medium. One or more portions of the state information corresponding to particular frequencies are used to determine at least one of: lateral tape movement, tape skew, vibration operation conditions, and roller performance. The lateral tape movement, if determined, may be used to position a coarse actuator to about a center position between outer extents of the lateral tape movement in response to determining the lateral tape movement.

A system according to one embodiment includes a processor and logic integrated with and/or executable by the processor. The logic is configured to generate track following controller state information based on a positional signal of a head relative to a medium. The logic is also configured to use one or more portions of the state information corresponding to particular frequencies to determine at least one of: lateral tape movement, tape skew, vibration operation conditions, and roller performance.

A computer program product according to one embodiment includes a computer readable storage medium having program instructions embodied therewith, the program instructions readable and/or executable by a controller to cause the controller to perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. Various embodiments described herein include using state information of a track-follow controller to recognize different operating conditions such as vibration and lateral tape movement, as will be described in further detail below.

In one general embodiment, a method includes generating track following controller state information based on a positional signal of a head relative to a medium. One or more portions of the state information corresponding to particular frequencies are used to determine at least one of: lateral tape movement, tape skew, vibration operation conditions, and roller performance.

In another general embodiment, a system includes a processor and logic integrated with and/or executable by the processor. The logic is configured to generate track following controller state information based on a positional signal of a head relative to a medium. The logic is also configured to use one or more portions of the state information corresponding to particular frequencies to determine at least one of: lateral tape movement, tape skew, vibration operation conditions, and roller performance.

In yet another general embodiment, a computer program product includes a computer readable storage medium having program instructions embodied therewith, the program instructions readable and/or executable by a device to cause the device to perform the foregoing method.

Figure 1A:
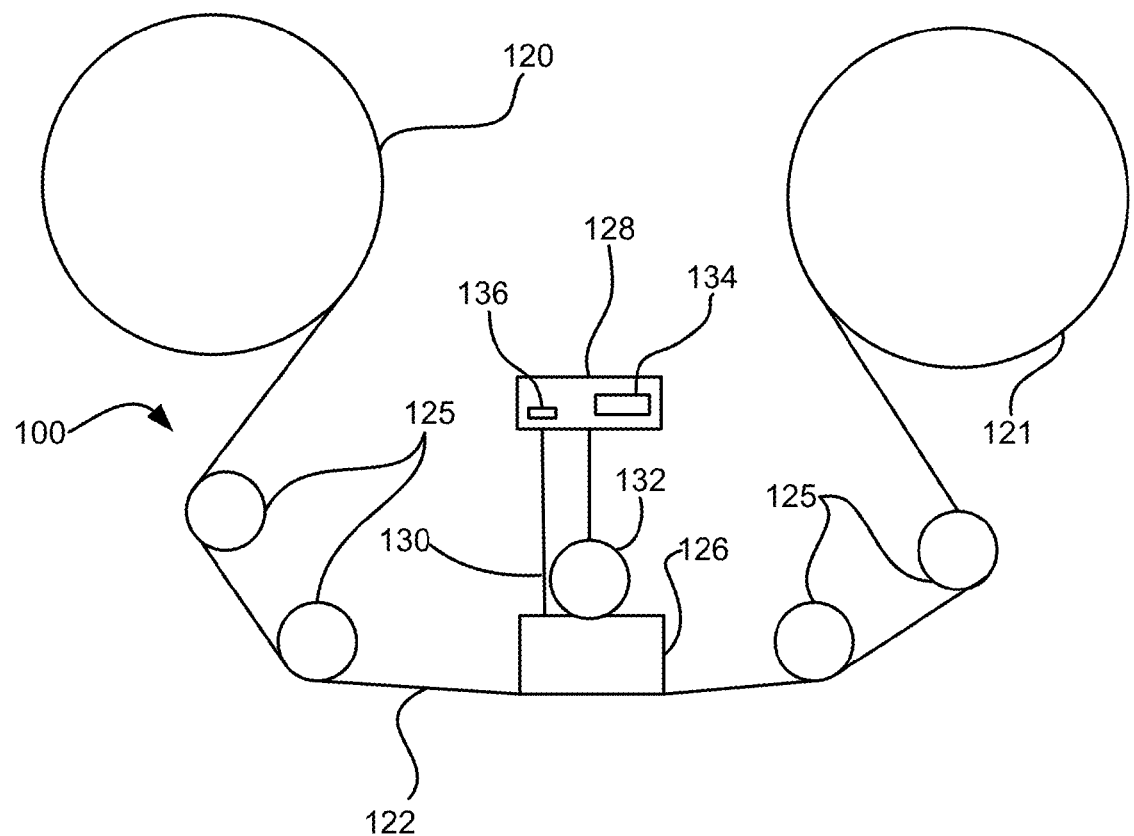
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
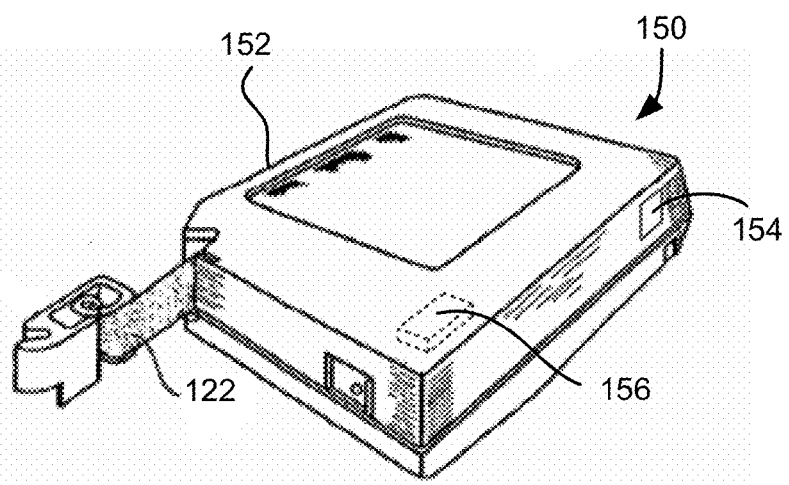
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
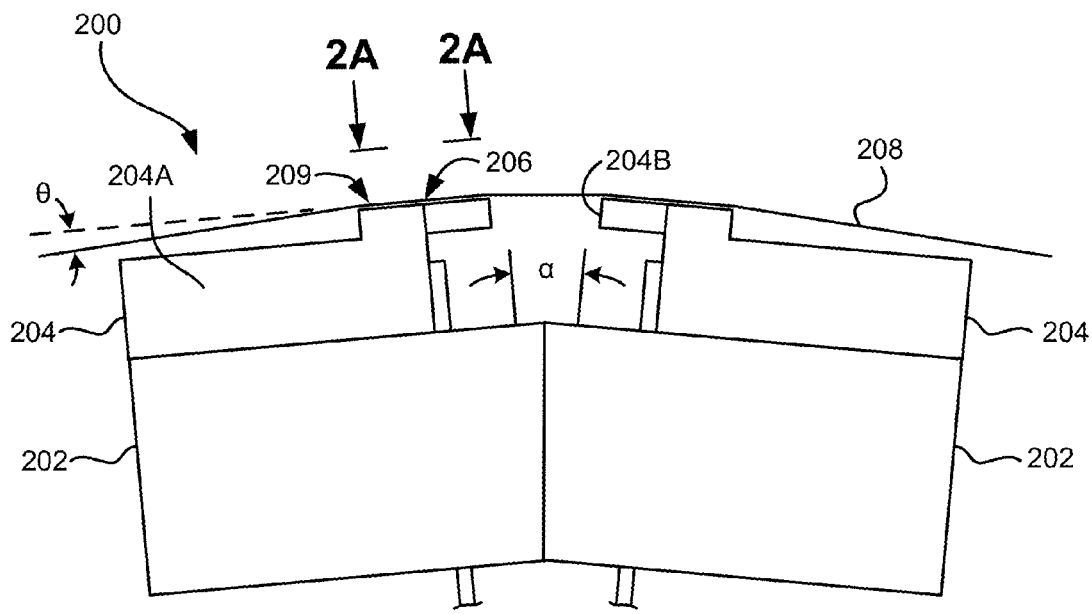
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
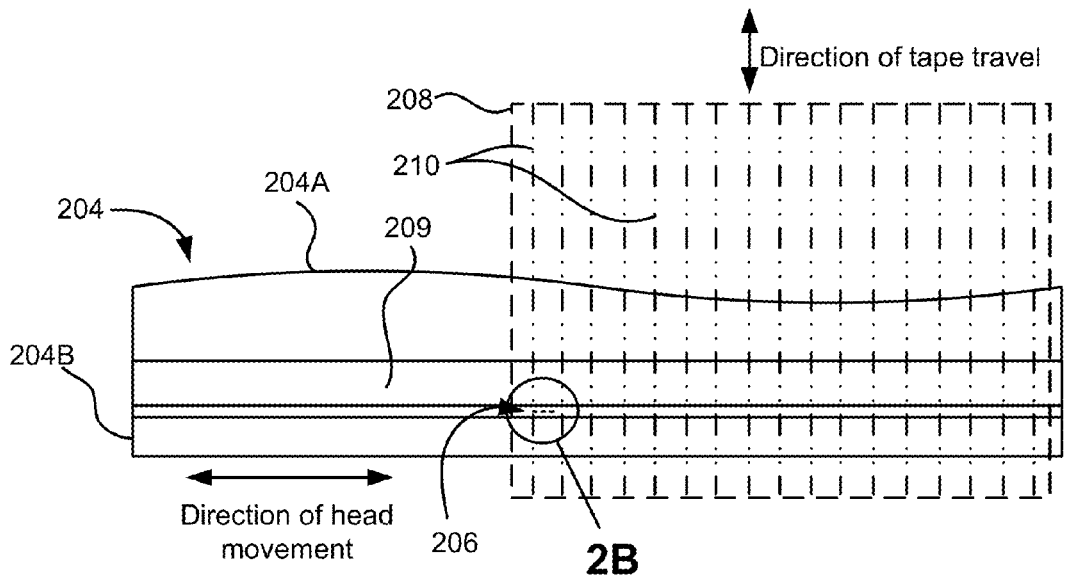
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
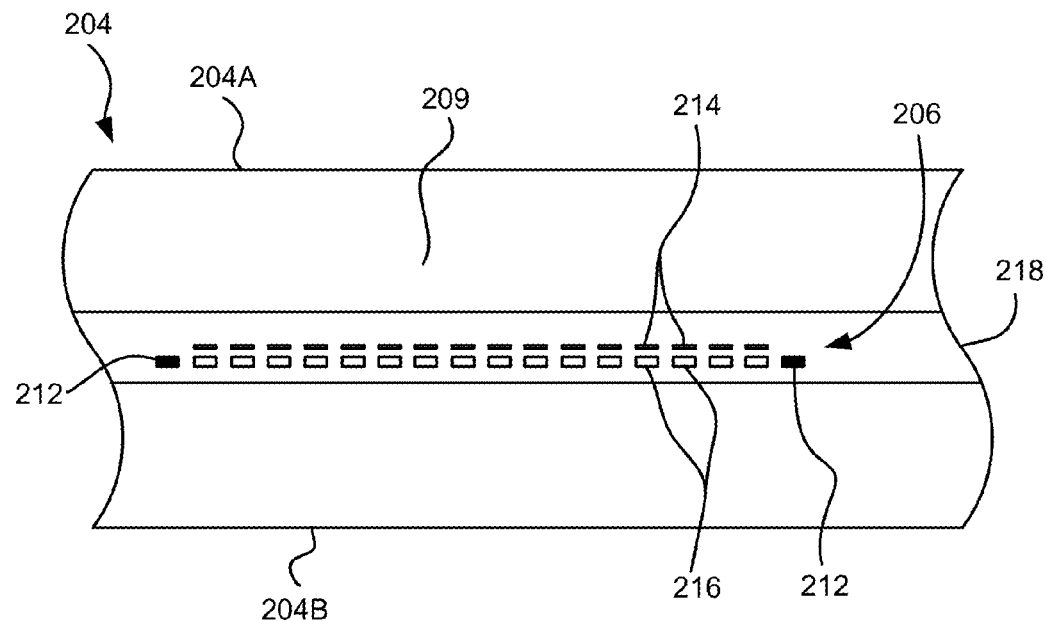
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
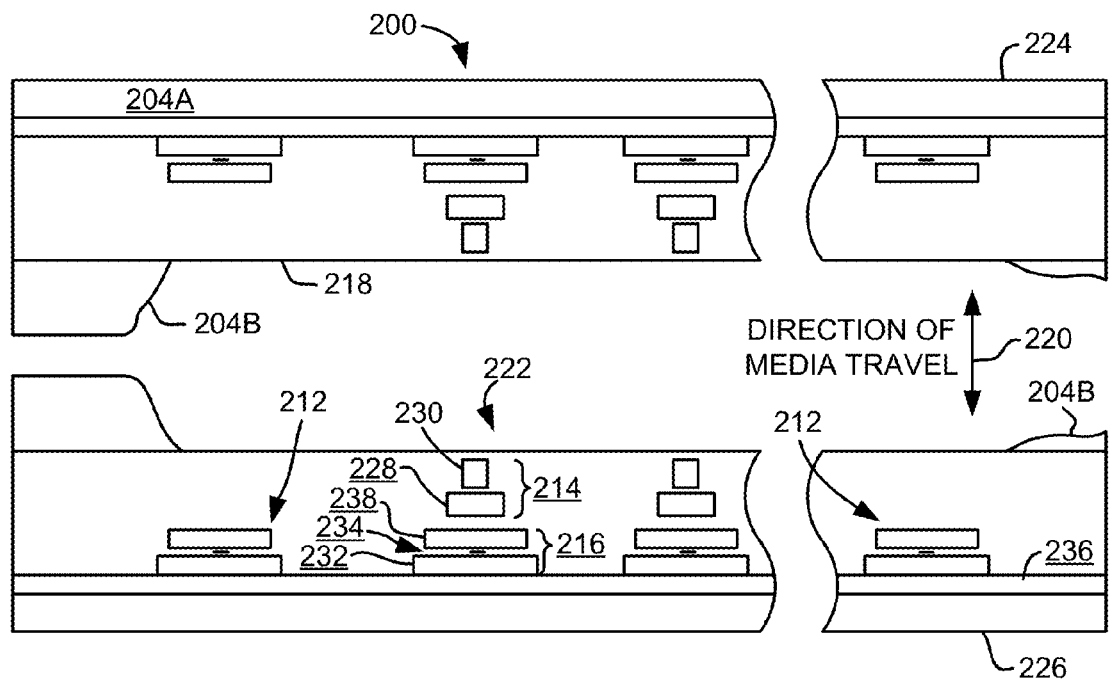
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. However, different embodiments may incorporate alternative orientations of the read and write transducers. For example, according to one approach, a R-W-R configuration may be implemented. Moreover, in other approaches, an R-R-W configuration, a W-W-R configuration, etc. may be implemented with any of the embodiments described and/or suggested herein. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

As previously mentioned, the continued capacity scaling of tape systems has led to increasing the track and linear bit density on recording tape. However, as the track and linear bit densities on recording tape continue to be reduced, improvements to the precision of the positioning of the recording head over the data tracks is desired, e.g., to prevent data read and/or write errors. Furthermore, operation of tape drive systems preferably includes robust performance of the track-follow servo system under shock and vibration conditions. Particularly, the increased tape track density lowers the tolerance in the acceptable track following error, thereby making it increasingly more challenging to meet the performance specifications under vibration conditions.

Further still, computational delays created as a result of the implementation of conventional track-follow controllers undesirably reduce the performance of such conventional products, as real-time information related to the system characteristics and operating conditions is important in deriving and adjusting drive system parameters related to the track-follow system. Specifically, controller implementations in conventional products are usually implemented in a series of interconnected second-order sections. Although somewhat efficient in terms of the total computation time required, these conventional products undesirably require that the output of the controller is calculated at the end of the computation of these second-order systems. Therefore, the total computational time is included in the track-follow loop delay and affects the performance of the system as a whole. Specific examples of real-time information of various system parameters are as follows.

A reliable estimation of lateral tape movement (LTM) is important for positioning the coarse actuator at about the center of the LTM at the target track, as stack shifts create high amplitude tape displacement at low frequencies that the fine actuator attempts to follow in conventional systems. In contrast, a reliable estimation of LTM would allow for the short-stroke, high-bandwidth fine actuator to follow the tape without the risk of running out of stroke. Yet, conventional controller configurations rely on an LTM estimate which is provided by the output of an integrator block. Moreover, for advanced controller designs of such conventional controller configurations, e.g. H∞ controllers, the integrator functionality is not implemented as a separate block but as a part of the overall controller.

Furthermore, skew-follow is highly desired in drives with flangeless rollers. In different embodiments, a tape skew estimate may enhance the skew-follow performance while also enabling reliable drive operation, e.g., in case only one servo channel is active. However, in conventional products, an estimation of the tape skew requires a disturbance observer and additional computations, thereby increasing the delay and decreasing performance of the system as a whole.

Additionally, determining the operation under vibration conditions may be useful, e.g., in the case of switching controllers. For approaches which include switching controllers, a higher bandwidth track-follow controller is selected when there is operation under vibration conditions. However, conventional products rely on the amplitude of the position error signal (PES) and/or the amplitude of the controller output, which are misleading, especially in the case of a poorly performing drive. Several effects can increase the amplitude of PES or the controller output and this may lead to an incorrect detection of vibration conditions and thereby negatively affect the system.

Finally, some drives show poor performance in terms of PES due to poor roller quality. Determination of poor roller performance can be useful during manufacturing or roller characterization procedures. However, again conventional products are incapable of accessing and/or utilizing this runtime information effectively.

Therefore, a new technique is desired for generating a reliable estimation of LTM, tape skew, vibration operating conditions and/or the presence of poor roller performance drive. Preferably the foregoing are performed in real time.

In sharp contrast to the shortcomings of conventional products described above, various embodiments described herein include a track-follow controller implemented in a state-space form. The implementation in state-space form reduces the computational delay experienced in the track-follow loop of conventional products. Furthermore, a procedure is described that explores the information provided by the states of the track-follow controller and provides important information in real time without significant additional computations, as will be described in further detail below.

Figure 3:
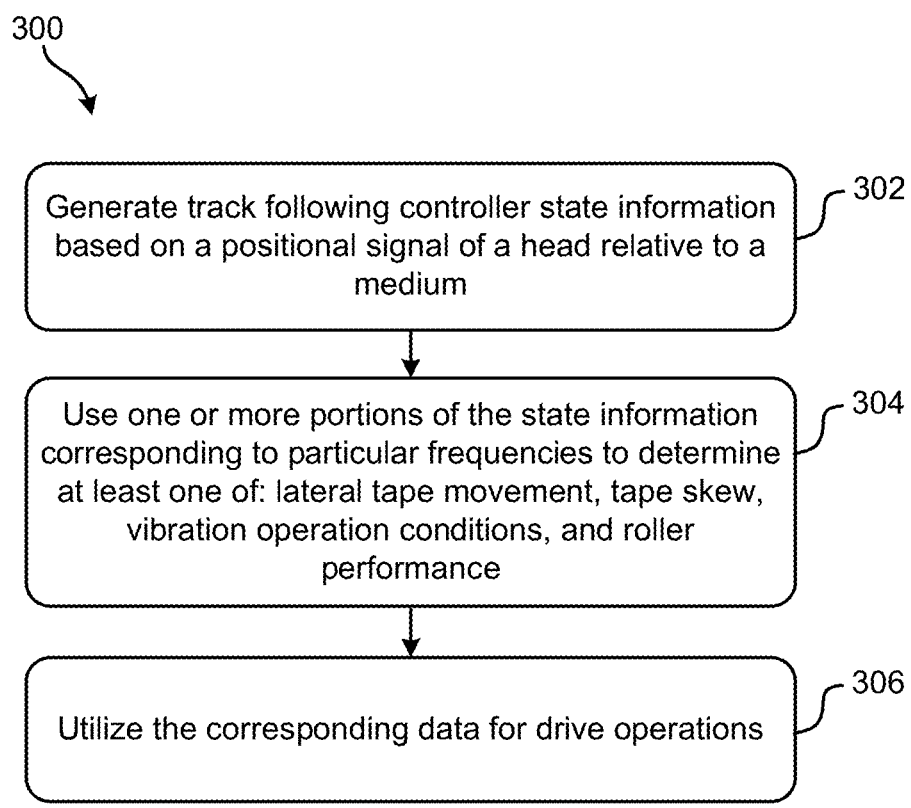
FIG. 3 is a flowchart of a method according to one embodiment.

Looking now to FIG. 3, a method 300 is depicted in accordance with one embodiment. As an option, the present method 300 may be implemented in conjunction with features from any other embodiment listed herein, such as those described with reference to the other FIGS., such as FIG. 3. Of course, however, such method 300 and others presented herein may be used in various applications and/or in permutations which may or may not be specifically described in the illustrative embodiments listed herein. Further, the method 300 presented herein may be used in any desired environment. Thus FIG. 3 (and the other FIGS.) should be deemed to include any and all possible permutations.

Referring still to FIG. 3, method 300 includes generating track following controller state information based on a positional signal of a head relative to a medium. See operation 302. According to one approach, the positional signal may be a PES, or signal derived therefrom.

Furthermore, operation 304 of method 300 includes using one or more portions of the state information corresponding to particular frequencies to determine at least one of: lateral tape movement, tape skew, vibration operation conditions, and roller performance.

The condition determined may be output, stored, used for further operations, etc. For example, upon determining at least one of the foregoing operation conditions, the corresponding data may be utilized for drive operations, e.g., controlling the coarse and/or fine actuators, controlling a skew actuator, altering a motor speed, etc. See optional operation 306.

In preferred embodiments, the track following controller is implemented in state-space form. Accordingly, the state information may be generated as a result of implementing a track-follow controller (e.g., of a track-follow compensator) in state-space form, thereby reducing delays of controllers and/or systems as a whole utilizing the state information, particularly when compared to the shortcomings of conventional products as previously mentioned.

As will be appreciated by one skilled in the art, a system having an input and an output may be represented in state-space form. Moreover, the state-space representation of a given system may be achieved using the following equations, or equations known in the art.

$$\dot{x} = Ax + Bu \qquad \text{Equation 1}$$

$$y = Cx + Du \qquad \text{Equation 2}$$

Referring to the foregoing equations, x represents the state vector, u represents the input vector and y represents the output vector. Additionally, A denotes a matrix having a size of n×n, where 'n' is determined by the number of states; B denotes a matrix having a size of n×m, where 'n' is determined by the number of states and 'm' is determined by the number of inputs; C denotes a matrix having a size of r×n, where 'r' is determined by the number of outputs and 'n' is determined by the number of states; and D denotes a matrix having a size of r×m, where 'r' is determined by the number of outputs and 'm' is determined by the number of inputs.

When applied to a track-follow controller, the input vector u is represented by the PES of the system of interest. In other words, the input vector used in the state-space representation equations is the PES generated by a given tape drive, e.g., see 100 of FIG. 1A. Furthermore, the output vector y is preferably utilized for drive operations, e.g., controlling the coarse, fine and/or skew actuators.

An exemplary in-use representation of how Equation 1 and Equation 2 may be implemented in MATLAB for a given set of values, which are in no way intended to limit the invention, is presented below.

$$A = \begin{array}{c|cccc} & x1 & x2 & x3 & x4 \\ x1 & 0.5929 & 0.4158 & 0.04652 & 0.07625 \\ x2 & -0.1805 & 0.4118 & -0.07221 & 0.03171 \\ x3 & -0.06018 & -0.1498 & 0.9812 & 0.04232 \\ x4 & -0.00121 & -0.006091 & 0.00748 & -0.0002513 \end{array}$$

$$B = \begin{array}{c|c} & u \\ x1 & 0.1585 \\ x2 & 0.07658 \\ x3 & 0.09579 \\ x4 & -0.0005478 \end{array}$$

$$C = \begin{array}{c|cccc} & x1 & x2 & x3 & x4 \\ y & -300.8 & 1039 & -124.5 & 3.045e+04 \end{array}$$

$$D = \begin{array}{c|c} & u \\ y & 159.4 \end{array}$$

Sample time: 5e-05 seconds

Discrete-time state-space model.

As shown, the resulting matrices are dependent on the number of states, inputs and outputs of the system being evaluated.

A microcode implementation of the foregoing in-use representation is also presented below. It should be noted that, as previously mentioned, the input and output values of the below microcode implementation are in no way intended to limit the invention, but rather are presented by way of example only.

$y = Cx + Du$ $\boxed{y = \text{Buffer} + D(1,1)*u}$ $up = u$ $X1p = X1$ $X2p = X2$ $X3p = X3$ $X4p = X4$ $\dot{x} = Ax + Bu$ $$\boxed{\begin{array}{l} X1 = A(1,1)^*X1p + A(1,2)^*X2p + A(1,3)^*X3p + \\ \quad A(1,4)^*X4p + B(1,1)^*up \\ X2 = A(2,1)^*X1p + A(2,2)^*X2p + A(2,3)^*X3p + \\ \quad A(2,4)^*X4p + B(2,1)^*up \\ X3 = A(3,1)^*X1p + A(3,2)^*X2p + A(3,3)^*X3p + \\ \quad A(3,4)^*X4p + B(3,1)^*up \\ X4 = A(4,1)^*X1p + A(4,2)^*X2p + A(4,3)^*X3p + \\ \quad A(4,4)^*X4p + B(4,1)^*up \end{array}}$$

$Cx$ $\boxed{\text{Buffer} = C(1,1)*X1 + C(1,2)*X2 + C(1,3)*X3 + C(1,4)*X4}$

According to additional embodiments, the resulting values of the state-space representation for a given system may be presented in alternate configurations than those calculated in the foregoing exemplary in-use representations. For example, the state-space representation of a given track-follow controller may be simplified to produce a block-diagonal matrix. According to some approaches, a block-diagonal matrix may have a block size of 1×1 for real eigenvalues, and a block size of 2×2 for complex eigenvalues.

An exemplary in-use representation of how Equation 1 and Equation 2 may be implemented in MATLAB for a given set of values to produce a simplified state-space representation, which again are in no way intended to limit the invention, is presented below.

$$A = \begin{array}{c|cccc} & x1 & x2 & x3 & x4 \\ x1 & 0.4929 & 0.2606 & 0 & 0 \\ x2 & -0.2606 & 0.4929 & 0 & 0 \\ x3 & 0 & 0 & 1 & 0 \\ x4 & 0 & 0 & 0 & 1.549e-17 \end{array}$$

$$B = \begin{array}{c|c} & u \\ x1 & -30.77 \\ x2 & -61.02 \\ x3 & 9 \\ x4 & 0.003378 \end{array}$$

$$C = \begin{array}{c|cccc} & x1 & x2 & x3 & x4 \\ y & 2.601 & -1.359 & 0.02214 & 59.19 \end{array}$$

$$D = \begin{array}{c|c} & u \\ y & 159.4 \end{array}$$

Sample time: 5e-05 seconds

Discrete-time state-space model.

As shown, the resulting A matrix includes several '0' values which ultimately simplifies the calculations required to produce the remainder of the data used to produce the state-space representation.

Furthermore, a microcode implementation of the foregoing in-use representation is also presented below. It should be noted that, as previously mentioned, the input and output values of the below microcode implementation are in no way intended to limit the invention, but rather are presented by way of example only.

$\boxed{y = \text{Buffer} + D(1,1)*u}$ $y = Cx + Du$ $up = u$ $X1p = X1$ $X2p = X2$ $X3p = X3$ $X4p = X4$ $$\boxed{\begin{array}{l} X1 = A(1,1)^*X1p + A(1,2)^*X2p + 0 + 0 + B(1,1)^*up \\ X2 = A(2,1)^*X1p + A(2,2)^*X2p + 0 + 0 + B(2,1)^*up \\ X3 = 0 + 0 + A(3,3)^*X3p + 0 + B(3,1)^*up \\ X4 = 0 + 0 + 0 + A(4,4)^*X4p + B(4,1)^*up \end{array}}$$

$\dot{x} = Ax + Bu$ $\boxed{\text{Buffer} = C(1,1)*X1 + C(1,2)*X2 + C(1,3)*X3 + C(1,4)*X4}$ $Cx$ However, it should also be noted that for embodiments having repeated eigenvalues and/or clusters of nearby eigenvalues, the block size may be larger than those seen in the exemplary representations above. For example, a model of the A matrix for a system having eigenvalues of ($\lambda_1, \sigma \pm j\omega, \lambda_2$) is presented below.

$$\begin{bmatrix} \lambda_1 & 0 & 0 & 0 \\ 0 & \sigma & \omega & 0 \\ 0 & -\omega & \sigma & 0 \\ 0 & 0 & 0 & \lambda_2 \end{bmatrix}$$

Figure 4A:
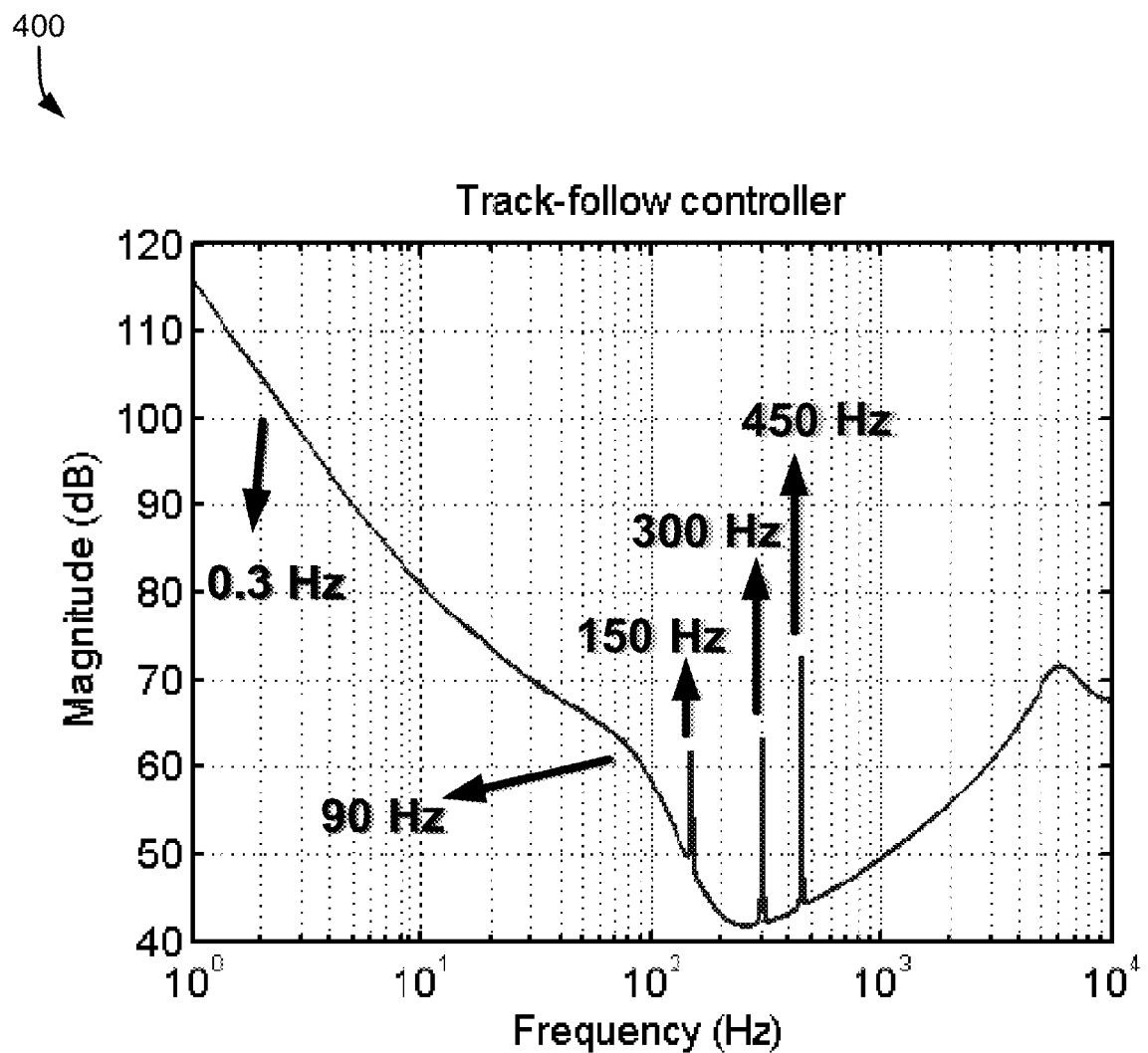
FIG. 4A is a graph illustrating a transfer function according to one embodiment.
Figure 4B:
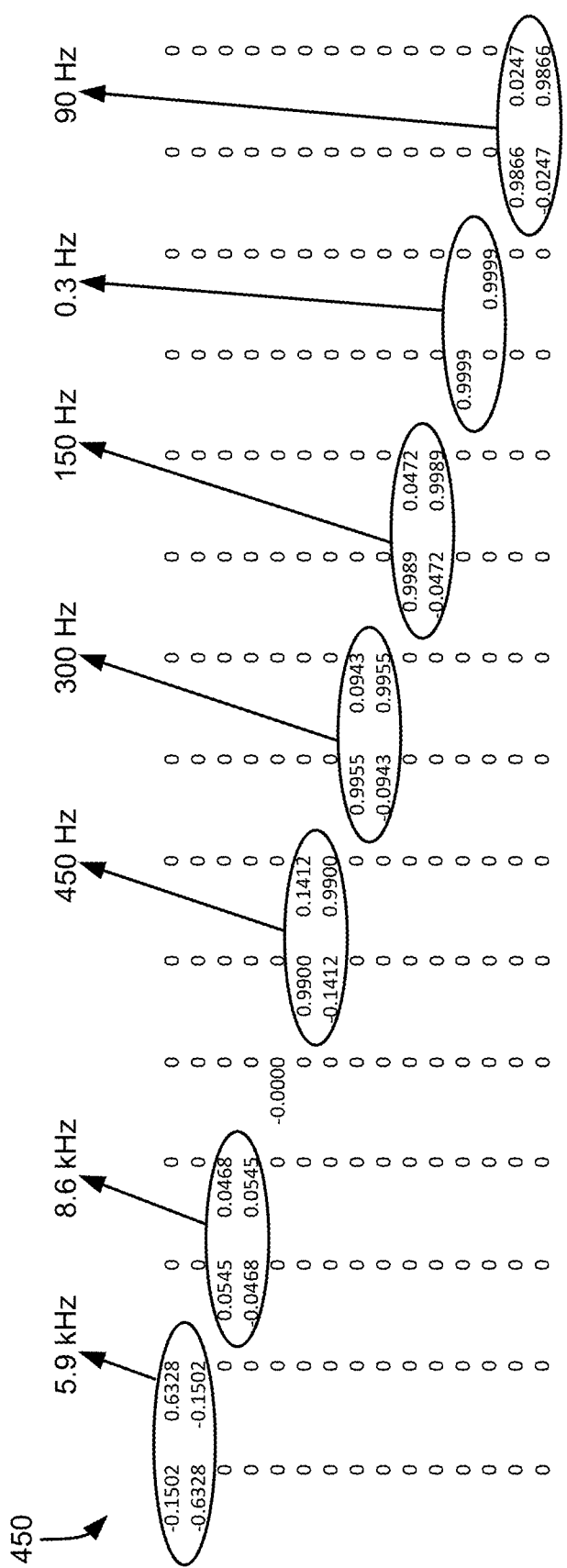
FIG. 4B is a matrix according to one embodiment.

When implementing the foregoing state-space representation to a track-follow controller, the corresponding PES is used in Equation 1 and Equation 2 as the input vector u. FIGS. 4A-4B illustrate a graph 400 and a corresponding A matrix 450, respectively. A matrix 450 was produced using one or more of the foregoing processes, e.g., using Equation 1 and Equation 2. Moreover, it should be noted that the graph 400 and a corresponding A matrix 450 correspond to an exemplary track-follow controller which is in no way intended to limit the invention, but rather is presented by way of example only.

Looking to FIGS. 4A-4B, the eigenvalues of matrix 450 correspond to specific frequency ranges of the graph 400 of the track-follow controller. Accordingly, the different eigenvalues of matrix 450 and matching frequency ranges of the graph 400 are marked with callouts.

Referring still to FIGS. 4A-4B, the inventors found that the eigenvalues of matrix 450 correspond to frequency ranges of interest on the graph 400. Specifically, for the lower frequencies of graph 400 having two integrators running, they correspond to the portion of matrix 450 labeled with 0.3 Hz. Furthermore, the slight bulge at about 90 Hz corresponds to the eigenvalues of matrix 450 labeled 90 Hz which represents an area where the track-follow controller had a higher gain as a result of an enhanced disturbance rejection to accommodate for given vibration environments. Further still, the three peaks seen in graph 400 correspond to the three roller frequencies of the track-follow controller and are represented by callouts 150 Hz, 300 Hz and 450 Hz. It follows that each line of the matrix actually corresponds to a state of a track-follow controller.

Figure 5A:
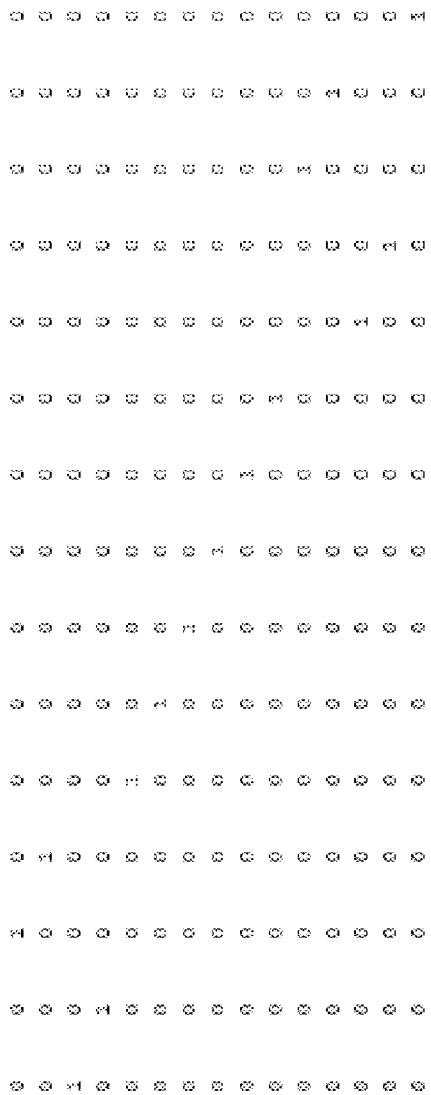
FIG. 5A is an illustration of a transformation matrix according to one embodiment.

Furthermore, a transformation matrix may be applied to matrix 450 to order the state coordinates and ensure a fixed location of the eigenvalues within the matrix. Moreover, by applying transformation matrix 500 as illustrated in FIG. 5A, the eigenvalues of matrix 450 may be reordered such that they are arranged in numerical order based on the frequency range of the graph 400 to which they correspond as illustrated in the matrix 550 FIG. 5B.

Figure 5B:
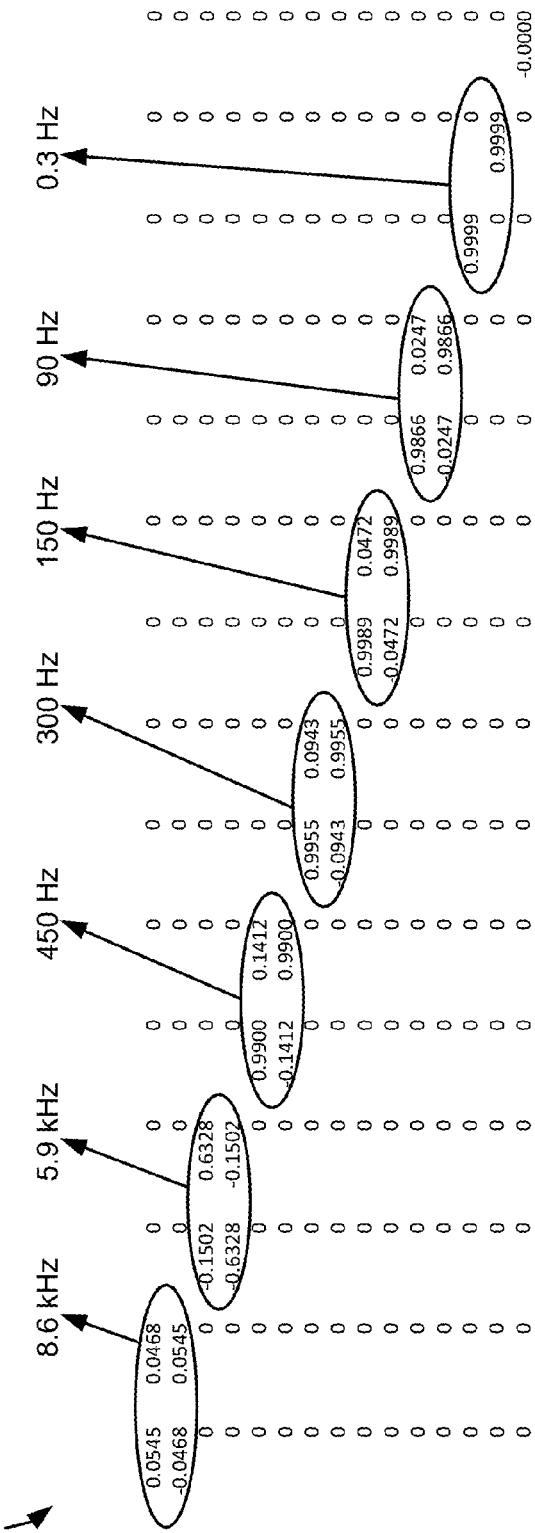
FIG. 5B is an updated matrix according to one embodiment.

Referring back to the method 300 of FIG. 3, once the track following controller state information is generated, one or more portions of that state information corresponding to particular frequencies may be used to determine one or more of: LTM, tape skew, vibration operation conditions, and roller performance. Specifically, according to preferred embodiments, the eigenvalues of an updated matrix (e.g., 550 of FIG. 5B) corresponding to the controller state information of a track-follow controller may be useful, e.g., for determining drive operation(s), in the following cases. It should be noted that although matrix 550 of FIG. 5B is used in the following descriptions, this is done by way of example only and is in no way intended to limit the invention. In other embodiments, matrices having different values and corresponding to different track-follow controllers may be used to determine one or more of the LTM, tape skew, vibration operation conditions, and roller performance for a given system. Furthermore, it should also be noted that according to other embodiments, eigenvalues corresponding to particular states of the system may be positioned differently among the rows and/or columns than as shown in matrix 550.

Figure 6A:
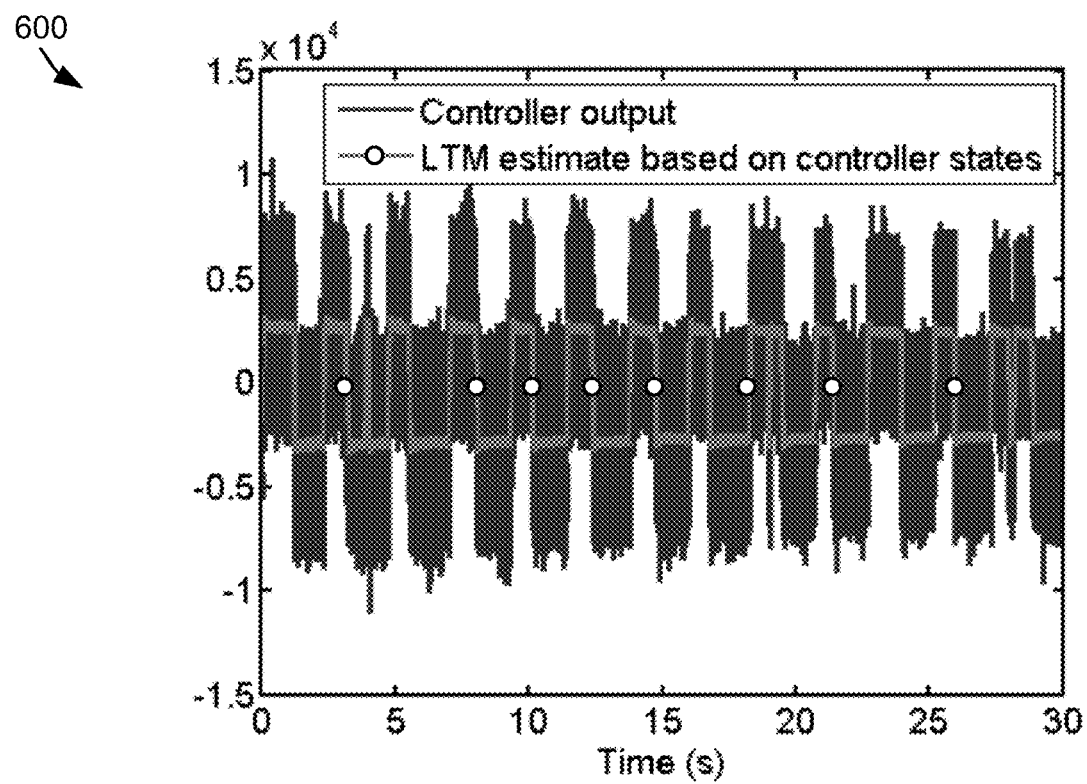
FIGS. 6A-6G are graphs depicting different representations according to different embodiments.

In view of the foregoing statement, the lateral tape movement may be determined using the one or more portions of the state information which correspond to one or more if the values presented in the eigenvalues of rows 13 (i.e., X13) and 14 (i.e., X14) in matrix 550. Momentarily referring to graph 600 of FIG. 6A, stack shifts create high amplitude tape displacement at low frequencies as illustrated by the controller output. In many cases, for conventional products the fine actuator is faced with compensating for these stack shifts which results in errors due to the fine actuator's low stroke as well as the slow computing time and unreliable LTM calculations produced by such conventional products.

Conversely, embodiments presented herein may produce a reliable LTM estimation using the following equation, or an equation known in the art.

$$LTM_{EST} = -C(1,13)*X13 - C(1,14)*X14 \qquad \text{Equation 3}$$

As shown, Equation 3 uses the frequency integrator states corresponding to the values presented in the eigenvalue of rows 13 and 14 in matrix 550 (FIG. 5B) to generate a reliable LTM estimate which may be used to position the coarse actuator at about the center of the LTM, e.g., at a target track. By using the coarse actuator to compensate for stack shifts of the LTM, this allows for the short stroke, high bandwidth fine actuator to follow the tape without the risk of running out of stroke.

In other words, the lateral tape movement may be determined using the one or more portions of the state information which correspond to the lower frequency characteristics of the controller in general. More specifically, the lateral tape movement may be determined using the one or more portions of the state information which correspond to one or more lower frequency portions of the state information relative to those usable for determining at least one of the vibration operation conditions and roller performance, as will soon become apparent. Those skilled in the art, once armed with the teachings herein, would be able to determine via routine experimentation which portions of state information of a give system would be usable for determining the various operating conditions mentioned herein.

Referring again to matrix 550 of FIG. 5B, an estimation of tape skew may be derived from a low frequency double integrator state. According to a preferred approach, one or more portions of the state information which correspond to one or more if the values presented in the eigenvalue presented in row 14 (i.e., X14) of matrix 550 may be used for determining the tape skew.

The ability to generate a reliable estimation of tape skew, e.g., to implement in a drive, is of significant desirability for systems having flangeless rollers as would be appreciated by one skilled in the art. A reliable estimation of tape skew can, among other things, enhance skew-follow performance, enable reliable drive operation even if only one servo channel is active, and improve the performance of the skew-follow control system.

According to a preferred embodiment, which again is in no way intended to limit the invention, a scaled value of the tape skew for a given system may be estimated using the following equation, or an equation known in the art.

$$\text{SKEW}_{EST} = -C(1,14)*X14 \qquad \text{Equation 4}$$

Figure 6B:
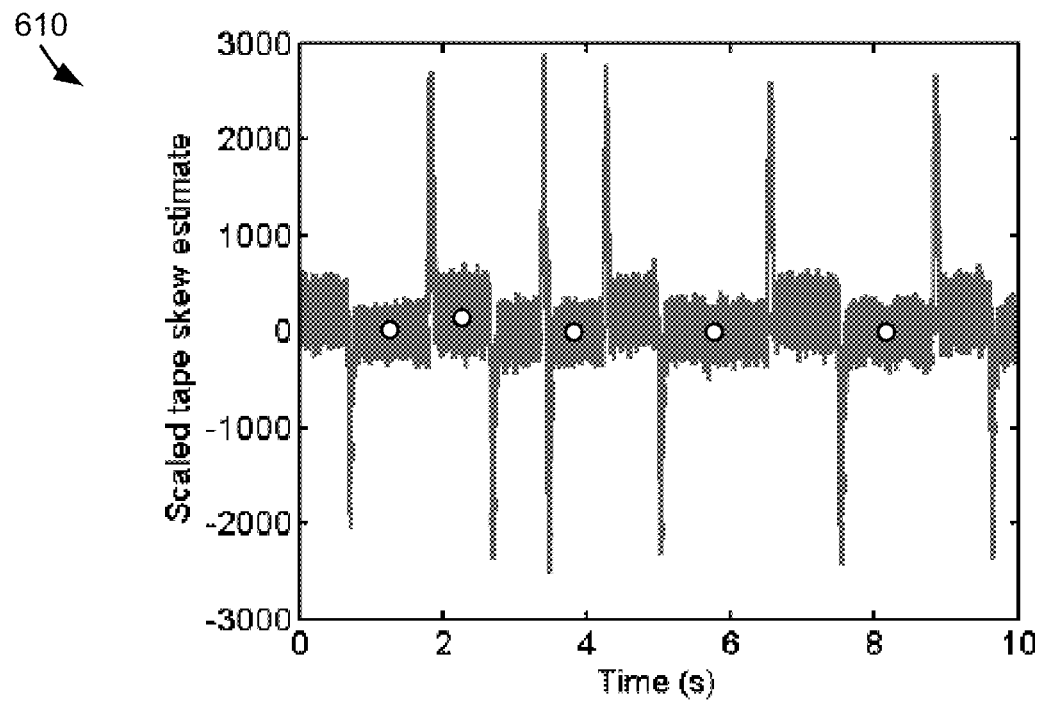
Figure 6C:
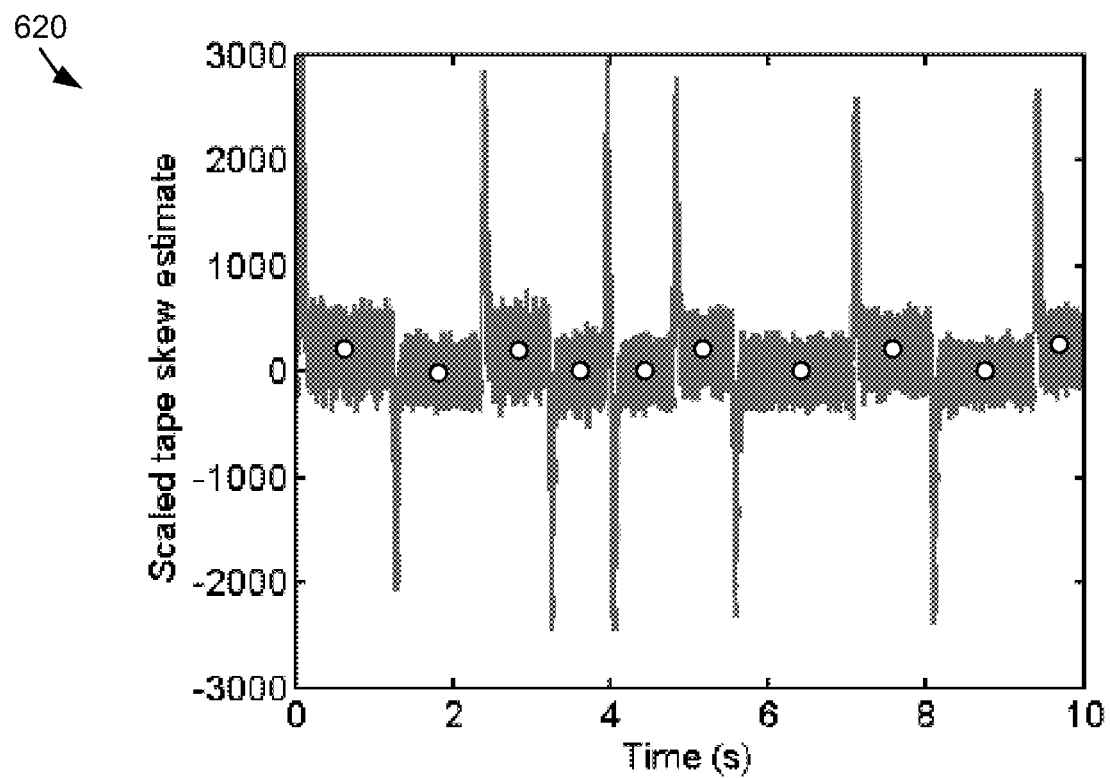

By implementing the foregoing equation, the skew estimate simplifies the implementation of the skew control scheme seeing that as a result, neither a disturbance observer nor additional computations are required. Moreover, a reliable and accurate estimation of tape skew is achievable for embodiments regardless of whether they have open loops and/or closed loops, as shown in graphs 610, 620 of FIGS. 6B-6C, respectively. Conventional systems are incapable of accurately estimating tape skew in closed loop systems without the use of additional structures (e.g. disturbance observer).

Thus, the tape skew may be determined using the one or more portions of the state information which correspond to one or more lower frequency portions of the state information relative to those usable for determining at least one of the vibration operation conditions and roller performance, as will soon become apparent.

According to additional embodiments, vibration operation conditions may also be determined using one or more portions of the state information which correspond to one or more if the values presented in the eigenvalues of rows 11 (i.e., X11) and 12 (i.e., X12), e.g., as presented in matrix 550 of FIG. 5B.

Some approaches may implement a threshold value to determine the presence of vibration operation conditions. For example, if the value of $\text{VIB}_{INFO}$ is greater than a given threshold, it may be presumed that vibration conditions are not present, while if the value of $\text{VIB}_{INFO}$ is less than a given threshold, it may be presumed that vibration conditions are present. Depending on the desired approach, the threshold may be predetermined, set by a user, calculated based on state information, etc. Moreover, in some approaches, determining vibration operation conditions may be useful when switching controllers of a given system.

$$\text{VIB}_{INFO} = -C(1,11)*X11 - C(1,12)*X12 \qquad \text{Equation 5}$$

Figure 6D:
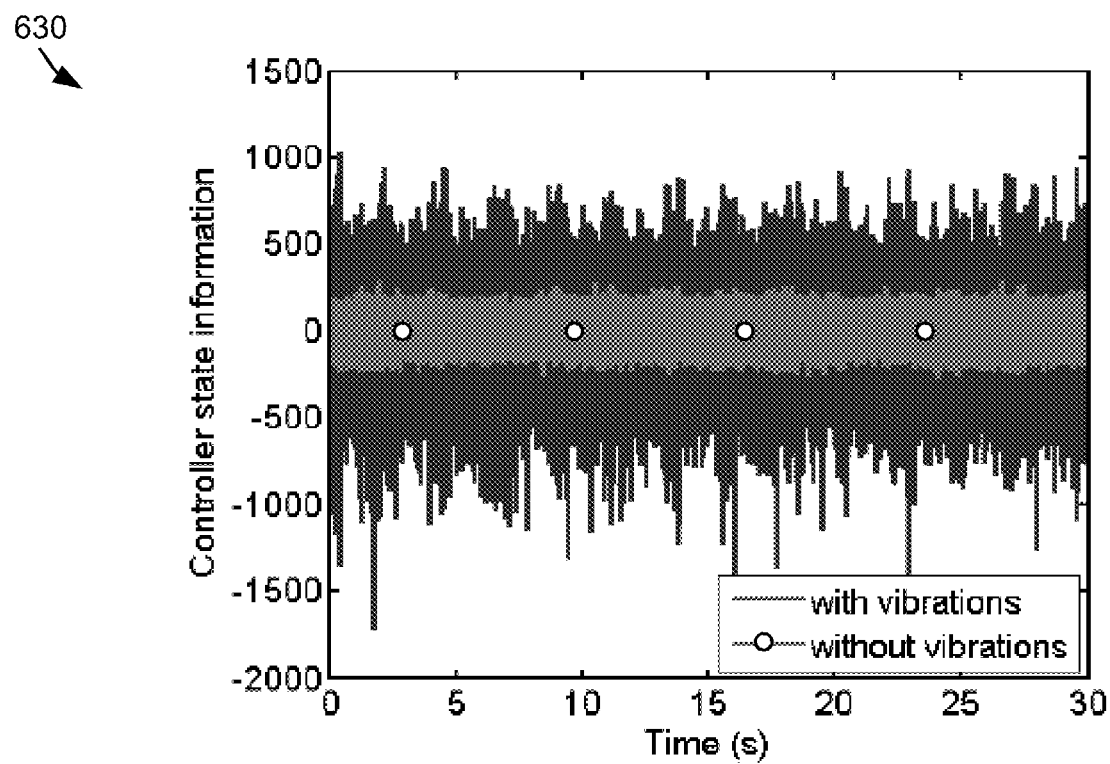

Using Equation 5 is greatly preferred over alternative options, particularly attempts to compare the PES and the controller output of a given system as this alternative method is highly misleading. The amplitude of the PES and controller output of a given system are similar and difficult to distinguish between, especially for systems having poor performance drives. Such complications may lead to an incorrect detection of vibration conditions, thereby compromising the performance of the system as a whole. In sharp contrast, looking to graph 630 of FIG. 6D, a noticeable difference in amplitude separates the controller state information with vibrations from that without vibrations.

In other words, the vibration operation conditions may be determined using the one or more portions of the state information which correspond to one or more lower frequency portions of the state information relative to those usable for determining the roller performance and higher than those usable for at least one of the lateral tape movement and the tape skew, as will soon become apparent. However, in alternative approaches, the vibration operation conditions may be determined using the drive vibration specification as would be appreciated by one having ordinary skill in the art upon having read the present description.

Further still, alternate embodiments may be able to determine the presence of poor roller performance drives using state information responsible for roller frequency disturbance rejection. Thus, some embodiments may be able to determine the roller performance using the values presented in the eigenvalues of rows 9 (i.e., X9) and 10 (i.e., X10); 7 (i.e., X7) and 8 (i.e., X8); and 5 (i.e., X5) and 6 (i.e., X6); e.g., as presented in matrix 550 of FIG. 5B.

Some drives have undesirable performance in terms of PES as a result of poor roller quality, as would be appreciated by one skilled in the art. Thus, determination of poor roller performance is desirable. According to some embodiments, monitoring the state information corresponding to roller frequency disturbance rejections provides an option to determine poor roller performance. Specifically, one or more of the following equations, and/or equations known in the art, may be used to perform monitoring of the roller performance, e.g., depending on the desired embodiment, performance conditions, tolerance factors, etc.

$$R_{F1} = -C(1,9)*X9 - C(1,10)*X10 \qquad \text{Equation 6}$$

$$R_{F2} = -C(1,7)*X7 - C(1,8)*X8 \qquad \text{Equation 7}$$

$$R_{F3} = -C(1,5)*X5 - C(1,6)*X6 \qquad \text{Equation 8}$$

Figure 6E:
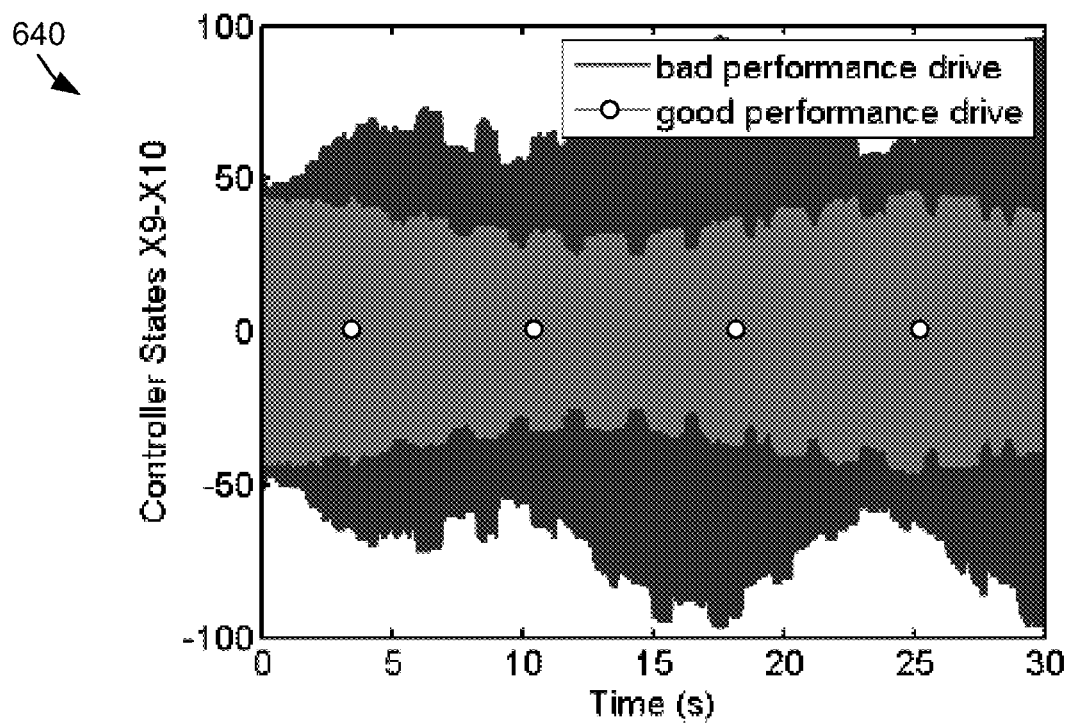
Figure 6F:
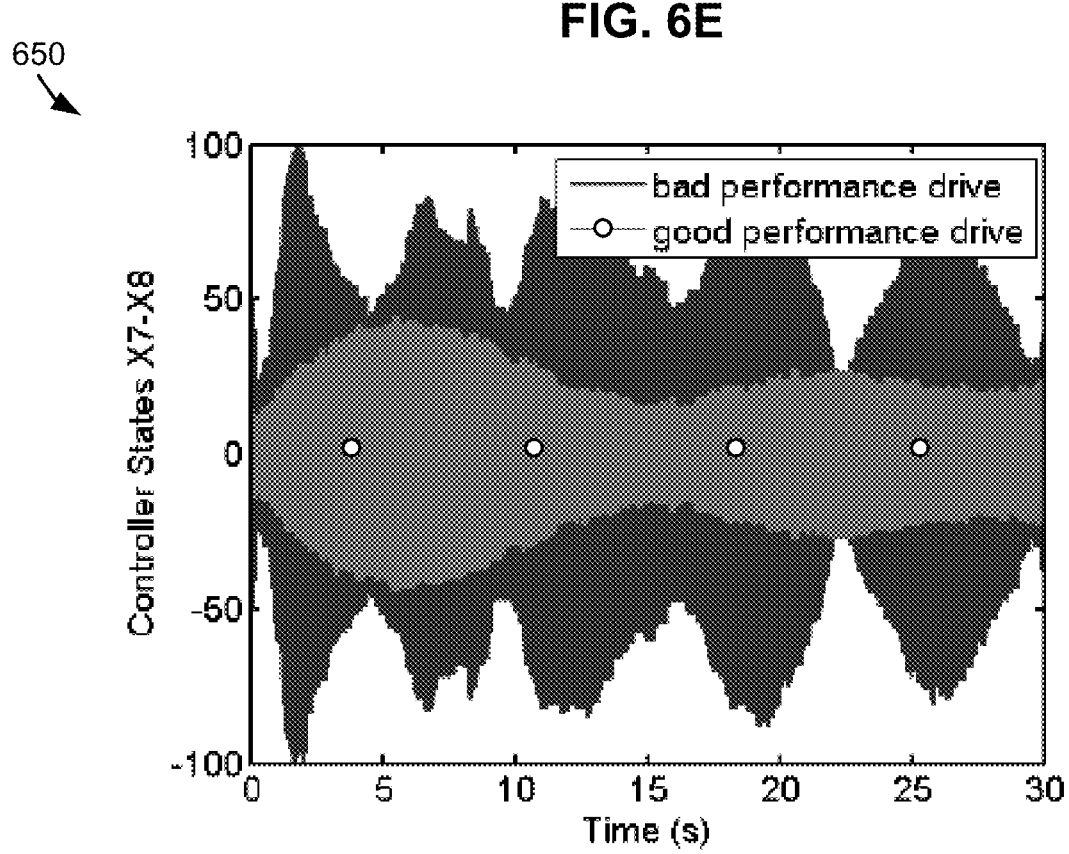
Figure 6G:
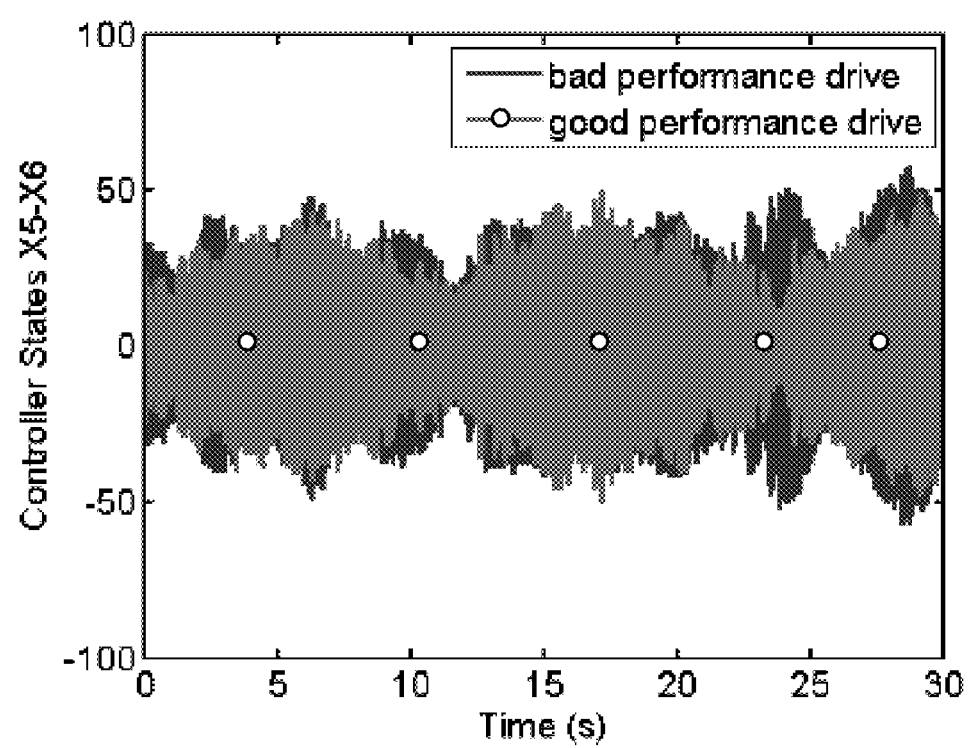

As illustrated in FIGS. 6E-6G, exemplary results of implementing Equations 6-8 respectively are presented. It should be noted that the data in each of the graphs 640, 650, 660 of FIGS. 6E-6G is presented by way of example and is in no way intended to limit the invention.

It follows that, in view of the foregoing description, the roller performance may be determined using the one or more portions of the state information which correspond to one or more higher frequency portions of the state information relative to those usable for determining at least one of the vibration operation conditions, the lateral tape movement, and the tape skew.

Moreover, this roller performance information may be used to determine the drive performance, at least in part. Whether or not a drive has poor performance in terms of PES because of poor roller quality cannot be determined by simply looking at the corresponding PES, but rather if states associated with the roller performance characteristic of the drive are monitored, poor performances may be identified if it is caused by the rollers. For example, looking to graphs 640, 650, 660, there are some poorly performing rollers in addition to some rollers that are performing well. It becomes apparent that higher values correspond to poor roller performance issues, while lower values on the graphs are associated with better roller performance. Thus, by monitoring this data, the roller performance may be determined.

According to some approaches, one or more of the frequencies of roller disturbances for a given embodiment may be calculated based at least in part on the roller rotation frequency, e.g., by using the following equation:

$$f = v/(\pi R) \qquad \text{Equation 9}$$

Looking to the variables of Equation 9, v represents the tape speed while R represents the radius of the roller. Once the roller rotation frequency f has been calculated, multiples of the frequency value may be used to capture the multiple harmonics of a given embodiment. Furthermore, it should be noted that for roller disturbances, the frequency of the roller rotation varies with the operating tape velocity; however a frequency corresponding to a vibration disturbance does not varying given different operational velocities of tape.

According to some embodiments, one or more threshold values may be used to distinguish when a drive has poor roller performance. For example, it may be determined that a drive has poor roller performance if the result of any one or more of Equations 6-8 result in a value that is above a given threshold, while a drive may have a good or acceptable roller performance if the result of any one or more of Equations 6-8 result in a value that is below a given threshold. As described above, a threshold may be predetermined, set by a user, calculated based on state information, etc.

As described above, upon determining at least one of the foregoing operation conditions, the corresponding data may be output, stored, utilized for drive operations, e.g., controlling the coarse and/or fine actuators (e.g., see 132 of FIG. 1A), etc. As a result, by implementing the track-follow controller in state-space form, various embodiments described and/or suggested herein are able to reduce the effects of computational delay. Moreover, utilizing the track following controller state information allows for the generation of important system information in real time, i.e., without added computational delays.

When compared to conventional methods of calculating each of the foregoing system characteristics, the various embodiments described herein greatly improve overall performance by reducing delays of the controller (e.g., 128 of FIG. 1A) and/or the system as a whole.

Although many embodiments described above implement the state-space representation of a track-follow controller, similar results may be achieved for embodiments applying a transfer function representation of a track-follow controller. According to one approach, the following equation, or an equation known in the art, may be used to generate a representation of a given track-follow controller.

$$K(s) = \frac{B(s)}{A(s)} = \frac{b_1 s^{n-1} + \ldots + b_{n-1} s + b_n}{a_1 s^{m-1} + \ldots + a_{m-1} s + a_m} \quad \text{Equation 9}$$

Moreover, in some approaches, Equation 9 may additionally or alternatively be used to form a graphical representation of a track-follow controller, e.g., as seen in graph 400 of FIG. 4A.

It should also be noted that any of the operations of method 300 and/or any embodiments associated therewith described and/or suggested herein may be performed by a processor of a system, such as a controller (e.g., see 128 of FIG. 1A).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
generating track following controller state information by a track-follow controller based on a positional signal of a head relative to a medium;
determining by a controller, using one or more portions of the state information corresponding to particular frequencies, status information, the status information being selected from a group consisting of:
lateral tape movement, wherein the lateral tape movement is used to position a coarse actuator to about a center position between outer extents of the lateral tape movement in response to determining the lateral tape movement,
tape skew,
vibration operation conditions, and
roller performance.

2. A method as recited in claim 1, wherein the status information is the lateral tape movement.

3. A method as recited in claim 2, wherein the one or more portions of the state information used for determining the lateral tape movement correspond to one or more lower frequency portions of the state information relative to those portions of the state information usable for determining at least one of the vibration operation conditions and roller performance, wherein the state information is also used to control a fine actuator during read and write operations.

4. A method as recited in claim 1, wherein the status information is the tape skew.

5. A method as recited in claim 4, wherein the one or more portions of the state information used for determining the tape skew correspond to one or more lower frequency portions of the state information relative to those portions of the state information usable for determining at least one of the vibration operation conditions and roller performance.

6. A method as recited in claim 1, wherein the status information includes the vibration operation conditions.

7. A method as recited in claim 6, wherein the one or more portions of the state information used for determining the vibration operation conditions correspond to one or more lower frequency portions of the state information relative to those portions of the state information usable for determining the roller performance and higher than those portions of the state information usable for at least one of the lateral tape movement and the tape skew.

8. A method as recited in claim 1, wherein the status information is the roller performance.

9. A method as recited in claim 8, wherein the one or more portions of the state information used for determining the roller performance correspond to one or more higher frequency portions of the state information relative to those portions of the state information usable for determining at least one of the vibration operation conditions, the lateral tape movement, and the tape skew.

10. A method as recited in claim 1, wherein the state information is implemented in state-space form, wherein the one or more portions of the state information are eigenvalues of a matrix corresponding to the controller state information of ft the track-follow controller.

11. A system, comprising:
a processor and logic integrated with and/or executable by the processor, the logic being configured to:
generate track following controller state information based on a positional signal of a head relative to a medium;
determine, using one or more portions of the state information corresponding to particular frequencies, status information, the status information being selected from a group consisting of:
lateral tape movement, wherein the lateral tape movement is used to position a coarse actuator to about a center position between outer extents of the lateral tape movement in response to determining the lateral tape movement,
tape skew,
vibration operation conditions of a drive environment, and
roller performance.

12. A system as recited in claim 11, wherein the status information is the lateral tape movement.

13. A system as recited in claim 11, wherein the status information is the tape skew.

14. A system as recited in claim 11, wherein the status information is the vibration operation conditions.

15. A system as recited in claim 11, wherein the status information is the roller performance.

16. A system as recited in claim 11, wherein the state information is implemented in state-space form, wherein the one or more portions of the state information are eigenvalues of a matrix corresponding to the controller state information.

17. A system as recited in claim 11, further comprising:
a drive mechanism for passing the medium over the head; and
a controller electrically coupled to the head.

18. A computer program product comprising a non-transitory computer readable storage medium having program instructions embodied therewith, the program instructions readable and/or executable by a controller to cause the controller to:
generate, by the controller, track following controller state information based on a positional signal of a head relative to a medium;
determine, by the controller, one or more portions of the state information corresponding to particular frequencies, status information, the status information being selected from a group consisting of:
lateral tape movement, wherein the lateral tape movement is used to position a coarse actuator to about a center position between outer extents of the lateral tape movement in response to determining the lateral tape movement,
tape skew,
vibration operation conditions of a drive environment, and
roller performance.

19. The computer program product of claim 18, wherein the status information includes the lateral tape movement, the tape skew, the vibration operation conditions, and the roller performance.

20. The computer program product of claim 18, wherein the status information is the roller performance, wherein the one or more portions of the state information correspond to roller frequency disturbance rejection.

* * * * *